INVENTOR.
ALBERT C. NOLTE JR.
BY *Nolte & Nolte*

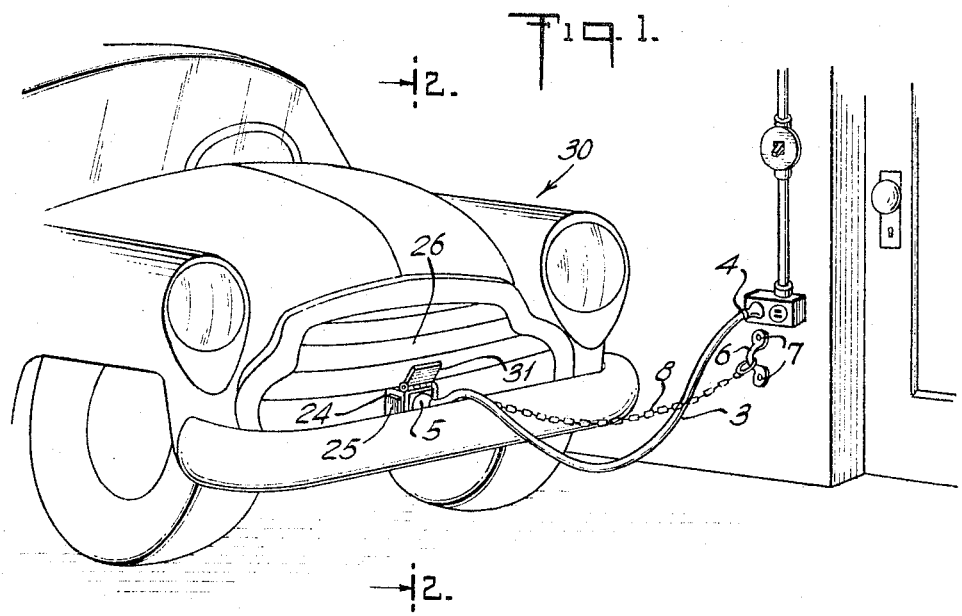
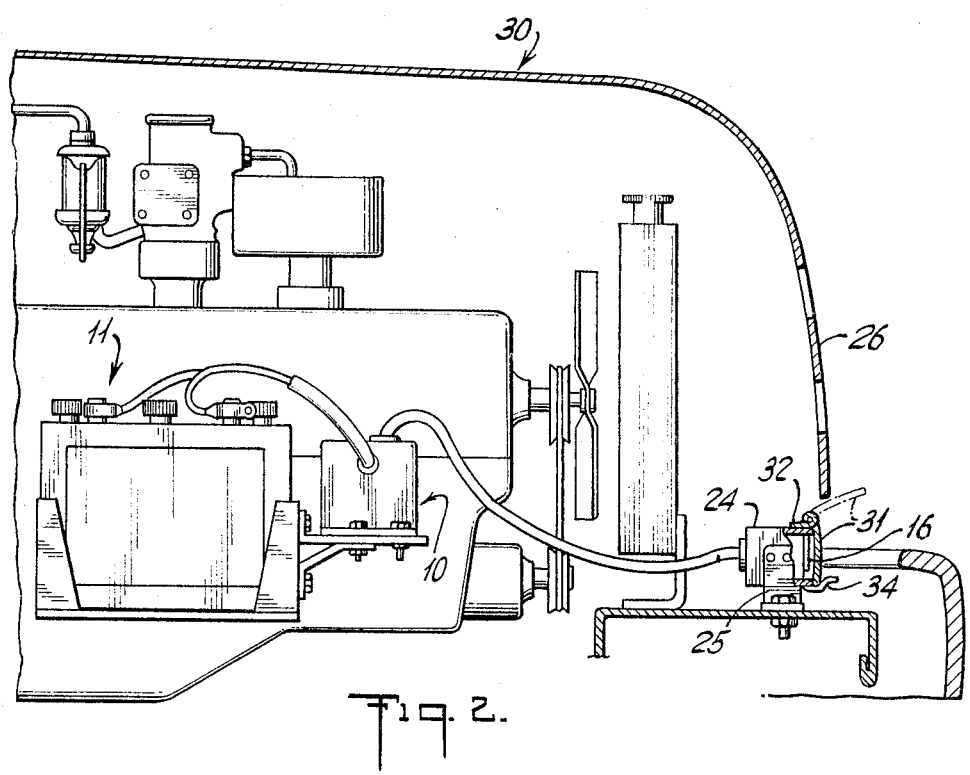

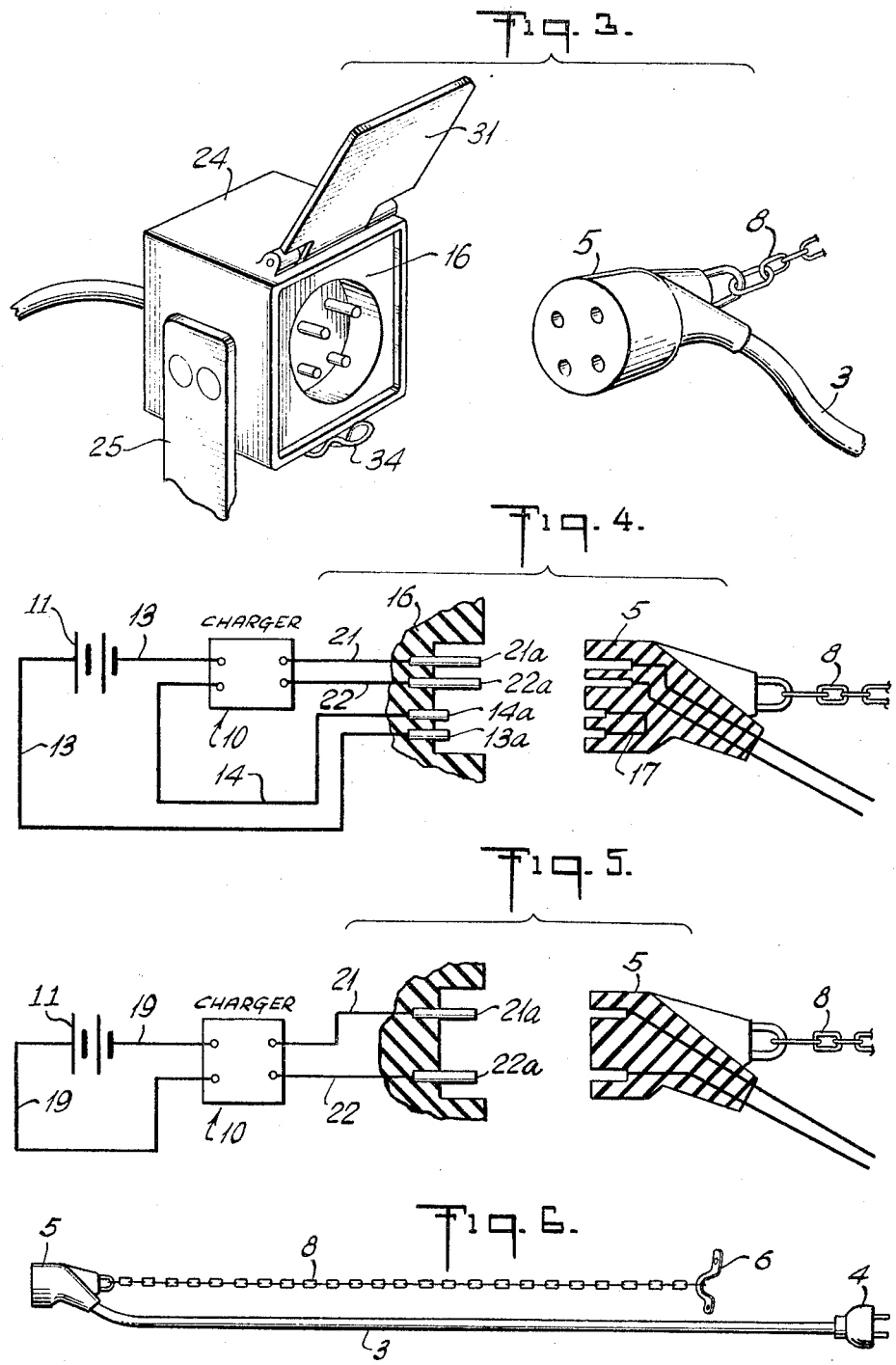

ATTORNEYS

United States Patent Office 3,270,267
Patented August 30, 1966

3,270,267
BATTERY CHARGING DEVICE
Albert C. Nolte, Jr., Oyster Bay Cove, N.Y., assignor to Elton Industries, Inc., New York, N.Y., a corporation of New York
Filed July 12, 1965, Ser. No. 473,907
9 Claims. (Cl. 320—56)

This application is a continuation-in-part of applications, Serial No. 597,245, filed July 11, 1956, for Battery Charging Device, by the present inventor, now abandoned; Serial No. 839,757, filed September 14, 1959, for Battery Charging Device, by the present inventor, now abandoned, and Serial No. 158,935, filed December 5, 1961, for a Battery Charging Device, by the present inventor, now abandoned.

The present invention relates to a device for the slow charging of automobile storage batteries. More particularly, this invention concerns a trickle charger contained within a car which is connected to the battery of the car and is capable of use when connected to a conventional current source.

The increased use of radios, heaters, lights and other electrical attachments of the present-day automobile has greatly increased the drainage of current from the standard automobile battery. In addition, this heavy burden on automobile batteries has been increased by the great number of automobiles on the road. Automobiles today are constantly accelerating, decelerating, starting and stopping which naturally reduces the life expectancy of the battery. Numerous types of heavy duty batteries have been developed for use in automobiles. These heavy duty batteries are priced greatly above the price of the ordinary battery and have not proven completely satisfactory.

In order to increase the life of the battery and to prevent damage to the cells within the battery, it is necessary to periodically have the batteries checked and charged. In order to charge the battery, the car may be left at the garage for a period of time to allow the necessary charging to take place or in the alternative the battery can be removed from the car and a rental battery substituted and the battery itself taken to a garage where it can be charged. However, it usually follows in both these cases that the action taken is not preventative but is corrective after the breakdown of the battery has taken place.

In another embodiment of the invention, having particular application to the powered vehicle field wherein an alternator is employed for generation of an electrical current in lieu of conventional D.C. generator, applicant's invention makes novel use of the rectifying means normally associated with the alternator as the battery charging device supplied by the outside electrical source. This particular arrangement has particular usefulness to modern automotive electrical systems wherein high current requirements, and cost considerations have dictated the use of an A.C. electrical generation system and a rectifier means in lieu of the conventional brush employing D.C. generator. These alternator employing vehicle electrical systems have the well known characteristic of producing a positive charging rate at relatively low engine r.p.m. speeds. Because these type systems inherently employ some type of rectifier means to convert the alternator output to a usable direct current for battery charging and ignition purposes, applicant's novel circuit configuration makes use of the rectifier already within the vehicle as a battery charging rectifier which may be supplied from an outside source of normal household current.

A primary object of this invention is to provide a battery charging device within the car itself, which, at the convenience of the user of the car and at a time when the car itself is not operating, can be attached to a conventional circuit or other current source in the user's garage to slow charge the battery.

Another object of the invention is to provide a novel circuit means between the alternator and rectifier of a vehicle electrical system to provide for recharging of the current storage device within the vehicle from an outside source of alternating current.

Yet another object of the invention is to provide a novel circuit wherein an alternator type automotive electrical system may be simply and easily converted to the charging of the battery therein from an outside source of alternating current.

Another object of this invention is to provide a battery charging device which is simple to construct, inexpensive to manufacture, efficient and effective in use and with a minimum number of parts making maintenance relatively easy.

For other objects and a better understanding of this invention, reference may be had to the following detailed description taken in connection with the accompanying drawing in which:

FIG. 1 is a pictorial view of the embodiment of this invention;

FIG. 2 is a partial plan view of the battery charging device mounted within the automobile taken along line 2—2 of FIG. 1;

FIG. 3 is a partial schematic figure of two detail parts of this invention shown in FIG. 1;

FIG. 4 is a schematic view showing the detail of the electrical circuit;

FIG. 5 is a schematic view showing a modification of the electrical circuits; and FIG. 6 is a pictorial view of the detachable part of this invention;

Figure 7:
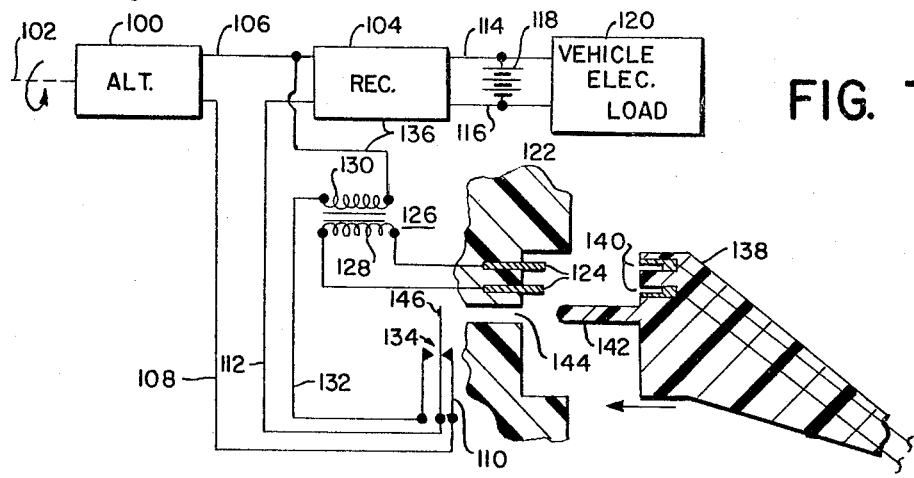
FIG. 7 is a schematic wiring diagram of another form of the invention as employed in a vehicle having an alternator electrical system.

Referring now to FIG. 1, there is shown a power cord, having a conventional wall outlet plug 4 at one end and a female plug 5 at its other end. A bracket 6 is mounted to a garage wall or other supporting structure by means of a plurailty of screws 7, only two shown.

A link chain 8 made of steel or other suitable material is affixed at one end to the plug 5 and at its other end to bracket 6. When the chain 8 is fully extended as shown in FIG. 6, it is shorter in length than the extended power cord 3, between the plug 5 and the bracket 6. Thus, when the chain 8 is in an extended tension position, the cord 3 will be loose and will hang freely.

A selenium rectifier charger 10 or other suitable trickle charger is suitably mounted within the general motor housing of the car and connected with the battery 11 by means of leads 13 and 14. These leads 13 and 14 terminate in the male plug 16, FIG. 4. The terminals 13a and 14a of leads 13 and 14 are closed in a circuit by a connector bar or wire 17 contained within the female plug 5. Thus, when the female plug 5 is engaged to the male plug 16 to supply power through terminals 21a and 22a of leads 21 and 22 to the trickle charger 10, at the same time, the connector bar 17 will close the circuits between the trickle charger 10 and the battery 11 by engaging the terminals 13a and 14a of wires 13 and 14. When the plug 5 is disengaged from the plug 16 and the terminals 13a and 14a are no longer connected by means of the connector bar 17, there will be no complete circuit between the battery 11 and the trickle charger 10 and therefore no leakage or drain of current.

If an electron tube rectifier charger is used, there would be no leakage or discharge between such a charger and the battery.

Therefore leads 13, 14, terminals 13a, 14a and connector bar 17 and receiving sockets for terminals 13a, 14a of plug 5 would be eliminated. The electron tube rectifier charger would be connected directly to the battery 11 by lead 19 as shown in FIG. 5.

As shown in FIGS. 2 and 3, the male plug 16 is carried inside a housing 24 mounted by suitable brackets 25 in the grillwork 26 of the automobile 30. A cover or shield 31 having a spring 32 is provided so that the cover is forced closed when the car is in normal use. The cover therefore appears as an integral part of the grillwork. However, when it is desired to connect the plug 5 to the plug 16, the cover is simply manually raised against the action of the spring. The cover in its open position is shown in dotted outline in FIG. 2. A clip spring 34 is provided to maintain the cover firmly closed.

In operation, the automobile 30 would be placed within a garage or in proximity to the current source to be used in activating the trickle charger. The female plug 5 would be inserted into the male plug 16 after the spring cover 31 has been raised. A male plug is preferably used in this embodiment as the plug mounted on the car, because if a female plug were used, the recesses within such female plug would become filled with dirt or other particles during normal car operation. This would necessarily hinder subsequent operation of the electrical circuit. However, a reversal of the plugs may be employed.

By referring to FIGS. 1 and 6, it will be seen that the chain 8 serves as a safety guard to insure the male plug 16 and the female plug 5 will be disengaged should the car be backed up without first disengaging these plugs.

In this manner, should the user of the car inadvertently start the car in motion, while the trickle charger, by means of the plug 16 is still connected to a current source by a plug 5 and cord 3, the chain 8 will pull the plug 5 in such a manner as to disengage it from the male plug 16. Since cord 3 is of greater length, no tension will be placed on the cord 3 or its electrical connection. Further, the spring cover 31, under the action of the spring 32, will automatically cover the male plug 16 in the housing 24 which was exposed by the removal of the plug 5 and restore the grillwork to an outwardly perfect appearance.

Referring to FIG. 7, an alternator 100 is shown having a rotary input drive shaft 102 and an electrical output connected to a rectifier 104 through conductors 106, 108, a normally closed contact 110, and another conductor 112.

A socket 122 made of any suitable insulating material and corresponding in general to the sockets 16 and 24 of the prior embodiments, may be affixed to any suitable exterior surface of the vehicle. The socket 122 carries a pair of contact members 124 electrically connected to the primary winding 128 of a step-down voltage transformer 126. The transformer 126 has a secondary winding 130 which is electrically connected through leads 132, normally open contact 134, conductor 112 and a conductor 136 to the input of rectifier 104. Adjacent the socket 122 is an electrical plug 138, similar to the plug 5 previously disclosed, which is provided with a pair of electrical current supply leads therein connected to jacks 140. The plug 138 carries a protruding pin portion 142 in registry with an aperture 144 of socket 122. When the plug 138 engages the socket 122, the pin 142 projects through the aperture 144 to displace the center contact member 146 in a leftward direction to open the normally closed contacts 110 and close the normally open contacts 134. Accordingly, it can readily be seen how the insertion of the plug 138 into the socket 122 is effective to connect normal household alternating current through the stepdown transformer 126 to the input of rectifier 104, and, at the same time, disconnect the alternator from the circuit thereby preventing application of the normal household current to the alternator output leads. In this manner, applicant's invention has made novel use of the existing rectifier means 104 of an alternator automotive electrical system for use as a battery charging device during periods of vehicle non-use.

Figure 8:
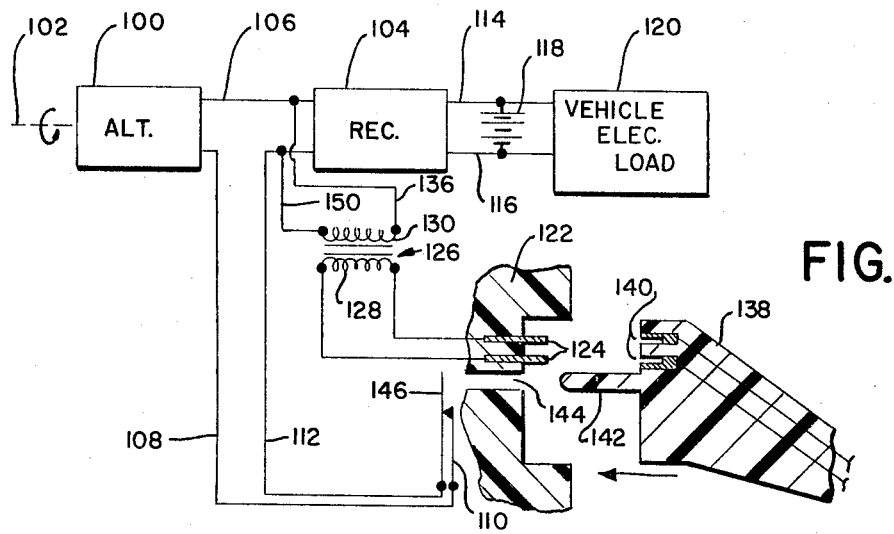
FIG. 8 is an electrical schematic of a modification of the circuit of FIG. 7.

FIG. 8 shows a modified form of FIG. 7 wherein the secondary winding 130 of the transformer 126 is permitted to remain connected across the input leads of the rectifier by way of conductor 136 and 150 during normal operation of the alternator. This arrangement thereby eliminates the need for the normally open contact points 134 of FIG. 7, and is possible without harm to the transformer because of the relatively high impedance of the unloaded secondary winding 130.

While the invention as disclosed in FIGS. 7 and 8 presupposes a typical automotive electrical system employing a 12 volt battery and an alternator normally having a voltage output slightly in excess thereof, and a nominal household electrical supply voltage of 115 volts, it should be appreciated that under circumstances where the external voltage supply is more in conformity with the vehicle voltage charging level, that the stepdown transformer means 126 could be eliminated without departing from the scope of applicant's invention.

It is, therefore, seen that a car can be placed within a garage for a night or for an extended period and a trickle charger activated by means of a power cord and suitable connections to slow charge the battery and therefore increase its life.

Of course, it should be understood that my invention is equally applicable to an electric powered vehicle needing frequent battery recharging.

I have described what I believe to be the best embodiments of my invention. I do not wish, however, to be confined to the embodiments shown, but what I desire to cover by Letters Patent is set forth in the following claims.

What I claim is:

1. In an automobile having a battery, a battery charging device including a trickle charger, first connecting means adapted to engage said charger to a power source, said first connecting means including a power cord, a female plug on said power cord, a recessed casing in the grill work of said automobile and a male plug mounted in said recessed casing adapted to be engaged by said female plug and two terminals in said male plug connected by lead wires to said charger, disconnecting means adapted to automatically disengage said male plug from said female plug, said disconnecting means including a bracket, said bracket fixedly mounted in proximity to a power source, a chain having one end mounted on said bracket, the other end of said chain fixedly attached to said female plug so that when the chain is extended it is shorter in length than the extended length of the power cord between the female plug and the bracket, and cover means to automatically cover said recessed casing when the female plug is disengaged by said disconnecting means, said cover means including a cover member framed by a rotatable section of grill work, and a spring mounted on said recessed casing, said spring adapted to reposition the cover as part of the grill work when said female plug is disengaged from said male plug, and second connecting means including at least one lead wire from said charger to said battery, at least one lead wire from said battery to a first terminal in said male plug, at least one lead wire from said charger to a second terminal in said male plug and a connector bar in said female plug adapted to engage said first and second terminals to close the circuit between the charger and the battery when said male plug is engaged by said female plug.

2. A battery charging device as in claim 1, wherein said trickle charger is a selenium rectifier charger.

3. A battery charging device as in claim 2, wherein said disengaging means disengages both said first connecting means and said second connecting means simultaneously when the automobile is moved away from the power source at a distance greater than the length of said chain.

4. In a vehicle having an engine, a battery, and an electrical system of the type employing an A.C. generator and a D.C. rectifier, the improvement comprising a socket secured to an exterior exposed surface of the vehicle, plug means for insertion into said socket having non-conducting pin means extending therefrom for disconnecting the vehicle A.C. generator from the rectifier, an external A.C. supply connected to said plug means, electrical means connecting said socket with the D.C. rectifier, and switching means disposed within said vehicle and responsive to said pin means to simultaneously disconnect the A.C. generator from the D.C. rectifier and connect the external A.C. supply to the rectifier upon insertion of said plug means into said socket.

5. Apparatus according to claim 4 wherein said means connecting said socket with said rectifier includes stepdown transformer means for reducing the magnitude of the alternating current supply.

6. Apparatus according to claim 5 wherein said switching means also disconnects the transformer means from said rectifier during periods when the external alternating current supply is disconnected.

7. In a vehicle having an engine, a battery and an electrical system employing an alternator, in combination therewith a battery charging system comprising a rectifier, electrical switching means for electrically connecting the input of the rectifier to the alternator, a battery connected across the output of the rectifier, the output of the battery being connected across the electrical system of the vehicle, electrical socket means permanently affixed to an exterior portion of the vehicle, a transformer having a primary winding electrically connected to said socket means and a secondary winding electrically connected across the input of said rectifier, a connecting means for connecting said transformer to an A.C. power source, said connecting means including a power cord, a plug attached to said power cord adapted to engage said socket means, disconnecting means for automatically disengaging said plug from said socket, and cover means for automatically covering said socket means when the plug is disengaged by the disconnecting means, a non-conducting pin laterally extending from said plug, resilient contact means connected to said alternator and said rectifier, and being responsive to said pin when said plug engages said socket means, whereby the connecting of said plug with said socket means simultaneously disconnects the alternator from the rectifier and supplies alternating current derived from said A.C. power source to the primary winding of the transformer.

8. In a vehicle having an engine, an alternator, a battery and a corresponding electrical system, in combination therewith a battery charging system comprising a rectifier normally in electrical contact with said alternator, a battery connected across the output of the rectifier, the output of the battery being connected across the electrical system of the vehicle, electrical socket means affixed to an exterior portion of the vehicle, a transformer having a primary winding electrically connected to said socket means and a secondary winding electrically connected across the input of said rectifier, a connecting means for connecting the primary winding of said transformer to an A.C. power source, said connecting means including a power cord, a plug attached to said power cord adapted to engage said socket means, disconnecting means comprising a flexible linkage means connected between said A.C. power source and said plug, said flexible means being shorter than said power cord for automatically disengaging said plug from said socket, cover means for automatically covering said socket means when the plug is disengaged by the disconnecting means and non-conducting pin means extending from said plug for interrupting the electrical connection between said alternator and said rectifier upon the insertion of said plug into said socket.

9. In a vehicle having a battery, a battery charging device comprising: a charger, a first coupling means disposed on the body of said vehicle; a first electrical connector adapted to engage said coupling means to a power source; a second coupling means disposed on one end of said first connector, and adapted to engage said first coupling means, disconnecting means adapted to automatically disengage said second coupling means from said first coupling means, said disconnecting means comprising: a bracket fixedly mounted adjacent to the power source, a flexible connecting means having one end mounted to said bracket, the other end of said flexible connecting means being fixedly engaged to said second coupling means so that when said flexible connecting means is extended it is shorter in length than the extended length of said first electrical connector; a second electrical connector between said first coupling means and said charger; a third electrical connector between said charger and said battery; and a bar located in said second coupling means to complete the electrical connection between said second and said third electrical connectors thereby completing the circuit between the battery and the charger when said first coupling means is engaged by said second coupling means.

References Cited by the Examiner

UNITED STATES PATENTS

| | | | |
|---|---|---|---|
| 967,681 | 8/1910 | Sloan | 339—10 |
| 1,689,495 | 8/1926 | McElroy | 200—51.09 |
| 2,069,250 | 2/1937 | Hyde | 200—51.09 X |
| 2,197,426 | 4/1940 | Del Camp | 200—51.09 |
| 2,555,630 | 6/1951 | Bishner | 321—8 |
| 2,723,380 | 11/1955 | Howard | 339—10 |
| 2,966,248 | 12/1960 | Armbruster | 320—2 X |

FOREIGN PATENTS 714,791  9/1931  France.

JOHN F. COUCH, *Primary Examiner.*

LLOYD McCOLLUM, *Examiner.*

S. WEINBERG, *Assistant Examiner.*